United States Patent
Elliott et al.

[11] Patent Number: 5,814,112
[45] Date of Patent: *Sep. 29, 1998

[54] NICKEL/RUTHENIUM CATALYST AND METHOD FOR AQUEOUS PHASE REACTIONS

[75] Inventors: Douglas C. Elliott, Richland; John L. Sealock, West Richland, both of Wash.

[73] Assignee: Battelle Memorial Institute, Richland, Wash.

[ * ] Notice: The term of this patent shall not extend beyond the expiration date of Pat. No. 5,616,154.

[21] Appl. No.: 775,337

[22] Filed: Dec. 19, 1996

Related U.S. Application Data

[63] Continuation-in-part of Ser. No. 227,892, Apr. 15, 1994, Pat. No. 5,616,154, which is a continuation of Ser. No. 893,701, Jun. 5, 1992, abandoned.

[51] Int. Cl.$^6$ .......................................... C10J 3/00
[52] U.S. Cl. ...................... 48/197 R; 585/240; 585/241; 502/304; 502/335
[58] Field of Search .................. 48/197 R, 209, 48/248; 585/240, 241; 502/304, 335

[56] References Cited

U.S. PATENT DOCUMENTS

| | | | |
|---|---|---|---|
| 3,152,998 | 10/1964 | Moss | 252/470 |
| 3,637,529 | 1/1972 | Van Beek et al. | 252/459 |
| 3,912,787 | 10/1975 | Nowack et al. | 260/667 |
| 4,146,741 | 3/1979 | Prichard | 568/865 |
| 4,251,394 | 2/1981 | Carter et al. | 252/452 |
| 5,476,877 | 12/1995 | Clavenna et al. | 518/703 |
| 5,616,154 | 4/1997 | Elliott et al. | 48/197 R |

FOREIGN PATENT DOCUMENTS

PCT/US93/05324  6/1993  WIPO.

OTHER PUBLICATIONS

Neopentane Reactions Over Bimetallic Pt–Sn/Al$_2$O$_3$ And Pt–Au/SiO$_2$ Catalysts, Baladrishnan and Schwank, Journal of Catalysis 132, 451–464, 1991.

Structural Studies of Pt–Sn Catalysts on High and Low Surface Area Alumina Supports, Srinivasan et al., Catalysts Letters 4 (1990) 303–308.

*Primary Examiner*—Nina Bhat
*Attorney, Agent, or Firm*—Paul W. Zimmerman

[57] ABSTRACT

A method of hydrogenation using a catalyst in the form of a plurality of porous particles wherein each particle is a support having nickel metal catalytic phase or reduced nickel deposited thereon in a first dispersed phase and an additional ruthenium metal deposited onto the support in a second dispersed phase. The additional ruthenium metal is effective in retarding or reducing agglomeration or sintering of the nickel metal catalytic phase thereby increasing the life time of the catalyst during hydrogenation reactions.

26 Claims, 2 Drawing Sheets

NICKEL/RUTHENIUM CATALYST AND METHOD FOR AQUEOUS PHASE REACTIONS

This patent application is a continuation-in-part of application Ser. No. 08/227,892 filed Apr. 15, 1994, now allowed, U.S. Pat. No. 5,616,154 which is a continuation of application Ser. No. 07/893,701, filed Jun. 5, 1992, abandoned.

This invention was made with U.S. Government support under Contract No. DE-AC06-76RLO 1830 awarded by the United States Department of Energy. The U.S. Government has certain rights in this invention.

FIELD OF THE INVENTION

The present invention relates generally to a nickel/ruthenium catalyst and method of aqueous phase reactions using the nickel/ruthenium catalyst. Aqueous phase reactions include steam reforming, hydrogenation and combinations thereof, for example methods for converting organic materials into a product gas composed primarily of methane, carbon dioxide and hydrogen. As used herein, the terms nickel and reduced nickel are used interchangeably.

BACKGROUND OF THE INVENTION

Use of nickel catalysts and copper/nickel catalysts is well known for use in catalyzing gas-phase chemical reactions (non-aqueous phase chemical reactions) as seen in U.S. Pat. No. 4,251,394 to Carter et al. Carter et al. teach a co-precipitation of nickel together with the copper and silicate ions resulting in a catalyst containing an amount of nickel from about 25 wt % to about 50 wt % and an amount of copper from about 2 wt % to about 10 wt %. The nickel within the nickel/copper/silicate catalyst begins reduction in the presence of hydrogen at about 200° C. lower than a nickel/silicate catalyst. They further demonstrate that the improved reduction of the nickel is not observed when the copper is simply added to a nickel/silicate catalyst surface. Under non-aqueous conditions (benzene in cyclohexane), they demonstrated that the nickel/copper/silicate catalyst had greater activity than the nickel/silicate catalyst.

The use of a nickel/copper/chromia catalyst in the presence of water, ammonia and aqueous ammoniacal solutions is discussed in U.S. Pat. No. 3,152,998 to Moss. Moss describes the necessity of a high fraction of reduced nickel (at least about 30% of the nickel) in order for the catalyst to be resistant to attrition in an aqueous ammoniacal solution. The catalyst is made from soluble salts, for example nitrates, of nickel, copper and chromium that are co-precipitated resulting in a catalyst composition of 60–85% nickel, 14–37% copper and 1–5% chromium. The catalysts are used to produce heterocyclic nitrogen compounds including piperazine and carbon-substituted alkyl derivatives, cycloalophatic amines from cycloalkanols and morpnoline and carbon-substituted alkyl derivatives. For reactions at temperatures from 150° C. to 400° C., the catalyst particles are demonstrated to remain whole for about 18 to 23 days.

Another patent, U.S. Pat. No. 4,146,741 to Prichard, also discusses catalyzed reactions in an aqueous phase. Prichard converts furan to 1,4-butanediol and tetrahydrofuran in a dicarboxylic acid and water in the presence of a catalyst of nickel/copper/chromium on a support. The thrust of this patent is the use of dicarboxylic acids and a non pyrophoric nickel catalyst. The amount of nickel may range from 1 to 60 wt %. The added copper (2 to 35 wt %) is shown to improve the yield of diol product. No comment is made with respect to catalyst integrity with or without one of the metal constituents. Prichard does not specify a useful support but indicates that any of several conventional support materials can be used.

Sinfelt, Journal of Catalysis, shows nickel copper alloy catalyst and states

... alloying of copper with nickel leads to catalytic effects in hydrogenolysis which are dramatically different from those observed for hydrogenation, dehydrogenation reactions ...

Thus, it is clear from Sinfelt that alloying of copper with nickel leads to increased catalytic activity compared to use of nickel alone. Surface areas of catalysts range from 0.63 m$^2$/g for 5% copper in nickel alloy 1.46 m$^2$/g for 95% copper in nickel alloy. Although Sinfelt reports low surface area catalysts in his paper, U.S. Pat. No. 3,617,518 describes a copper nickel alloy dispersed on supported catalyst providing a higher surface area.

More recent work by Elliott et al. (Ind. Eng. Chem. Res. Vol. 32, No. 8, pp. 1542–8, 1993) has focused upon aqueous phase reactions at 350° C., wherein it was discovered that the commercially available catalysts (nickel-only) interacted with the water in the aqueous phase resulting in agglomeration or sintering of the catalytic metal (nickel-only) dispersed upon the support thereby reducing the activity and effective life time of the catalysts. The commercially available catalysts tested was a range of commercially produced supported nickel metal catalysts used for hydrogenation, steam reforming, and methanation reactions. In addition, Elliott et al. found that commercially available silica, alumina, and silica-alumina catalyst supports were not stable in an aqueous processing environment. Because Prichard operated a batch process making no time based observations of his catalyst, and because his process was limited to about 7 or 8 hours, he would not have observed any degradation of catalyst and therefore would have no motivation to solve the problem of limited catalyst life in aqueous media at elevated temperatures required for a continuous process. The problem of support stability is avoided by Moss by the use of an alloy catalyst with a small amount of chromia binder.

It has been reported by R Srinivasan, R J DeAngelis, B H Davis Catalysis Letters, 4 (1990) 303–8 that improved activity of Sn/Pt catalysts for hydrocarbon reforming in a gas phase reaction might be explained by Sn stabilization of Pt crystallites formed on alumina. However, ratios of 3 to 4 of Sn to Pt were required for maximum effect, but alloy formation is not believed to be the cause.

Further, K Balakrishnan and J Schwank, Jour. of Catalysis, 132 (1991) 451–464 report that Sn addition reduces the activity for Pt catalyzed hydrocarbon reforming in the gas phase at 300° C. while improving the activity maintenance. In contrast, Au (gold) addition improved the activity but made no significant difference in the rate of deactivation.

However, until Elliott et al., the problem of nickel agglomeration for aqueous phase reactions at these temperatures was not observed. Accordingly, there is a need for a catalyst that avoids agglomeration in aqueous phase reactions.

SUMMARY OF THE INVENTION

The present invention is a nickel/ruthenium catalyst wherein the catalyst is in the form of a plurality of porous particles wherein each particle is a support having nickel metal catalytic phase or reduced nickel deposited thereon as a dispersed phase and the ruthenium metal deposited onto the support as an additional dispersed phase. The ruthenium metal dispersed phase, in addition to increasing activity compared to the use of nickel alone, is effective in retarding or reducing agglomeration or sintering of the nickel metal catalytic phase thereby increasing the effective life time of the catalyst in an aqueous phase reaction.

It is an object of the present invention to provide a method of performing aqueous phase reactions wherein a reduced nickel/ruthenium catalyst resists agglomeration or sintering in aqueous phase processing.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1 is pictorial and does not explicitly show all of the pores and/or droplets present on an actual catalyst particle.

DESCRIPTION OF THE PREFERRED EMBODIMENT(S)

Figure 1:
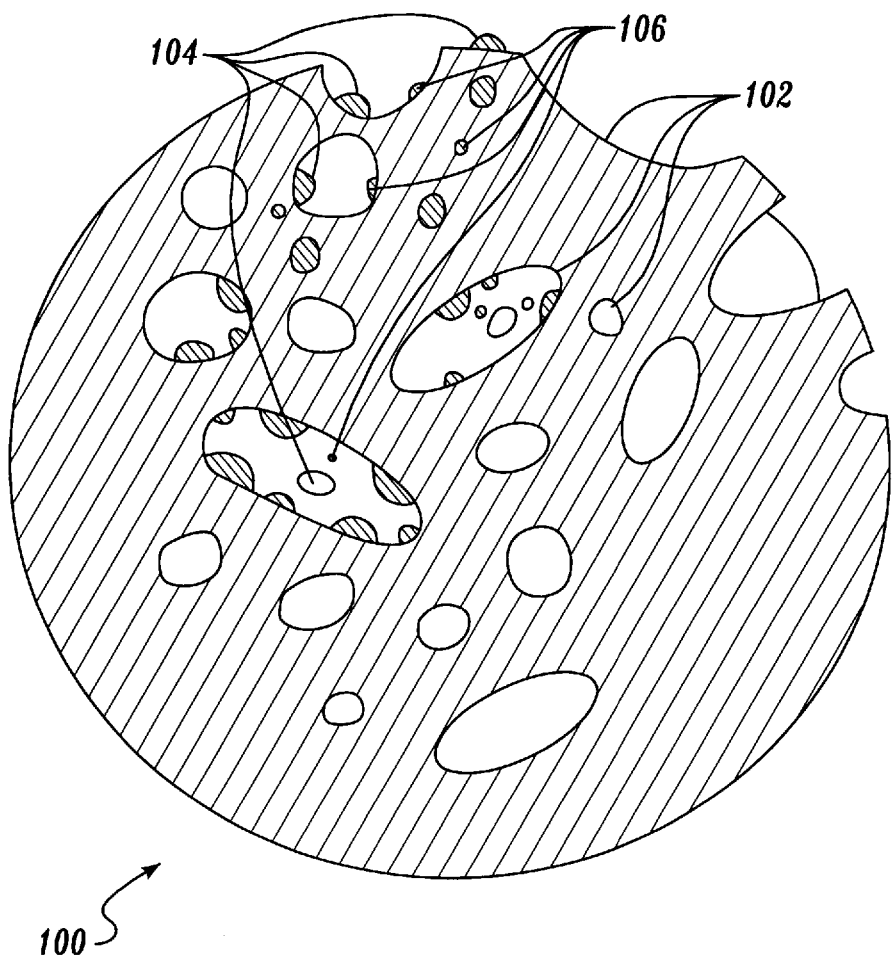
FIG. 1 is an enlarged cross section view of a catalyst particle according to the present invention.

In accordance with one aspect of the present invention, a method for an aqueous phase chemical reaction of an organic material has the steps of:

providing a liquid reactant mixture containing liquid water and the organic material within a pressure reactor;

adding a catalyst in the form of a plurality of particles, each particle formed of a porous support with an amount of a reduced nickel metal catalyst phase deposited upon the porous support in a first dispersed phase providing a catalyst activity, further having a ruthenium metal upon the porous support as a second dispersed phase in an amount that is effective in resisting agglomeration or sintering of the nickel metal catalyst phase, wherein the second dispersed phase is separate and distinct from said first dispersed phase, and maintaining the liquid reactant mixture at temperature and pressure conditions sufficient to perform the aqueous phase reaction.

A catalytic steam reforming reaction is generally carried out in the pressure reactor at temperature and pressure conditions of from about 300° C. to about 450° C. and at least 130 atmospheres for a period of time. When the temperature and pressure conditions are effective to maintain the reactant mixture substantially as liquid, the effective amount of reduced metal catalyst and the period of time being sufficient to catalyze a reaction of the liquid organic material, a product gas composed primarily of methane, carbon dioxide and hydrogen is produced.

A hydrogenation reaction is generally carried out catalytically in water at a temperature from about 150° C. to about 350° C. with a hydrogen overpressure. Hydrogenation can include saturation of multiple bonds, reduction of oxygen functional groups, such as ketones, aldehydes, lactones and carboxylic acids; hydrogenolysis, such as reduction of alcohols and phenolics, scission of ether linkages and all similar reactions of organically bound nitrogen; hydrocracking of hydrocarbon structures; or methane synthesis. More specifically, hydrogenation reactions include but are not limited to sorbitol conversion to ethylene glycol, propylene glycol, and glycerol; levulinic acid conversion to gamma valerolactone; 1,4-pentanediol and methyl tetrahydrofuran, xylitol conversion to ethylene glycol and glycerol; succinic acid conversion to gamma butyrolactone, 1,4-butanediol and tetrahydrofuran.

For the purpose of this disclosure, "liquid organic material" means any organic compound or mixture of such compounds that exists as or decomposes to a liquid or gas at a temperature of at least 250° C. and at a pressure of 50 atmospheres or more, and any aqueous solution, or any flowable suspension, slurry or sludge containing such a compound or mixture. Examples of potential feedstocks include wastewater streams such as 0.5% hexamethylene diamine in water from nylon manufacture, or 2% to 3% mixed phenols in water from resin manufacture that would be treated primarily for waste destruction. Other feedstocks such as cheese whey, peat, or high-moisture biomass feedstocks would be treated primarily as energy recovery systems. In some cases, both energy recovery and waste destruction would be achieved. The process can treat liquid organic materials having wide ranges of organic concentration from parts per million levels to significantly higher. The process can be used as a method of destroying organic waste or as a method of converting organic feedstocks to an energy source.

Preferably, the liquid organic material and water are fed to a reactor pressure vessel in the form of an aqueous solution or slurry. Where the liquid organic material inherently contains a desired amount of water, such would comprise the liquid reactant mixture without a requirement for added water.

Inside the reactor, the organic material and water are preferably maintained at subcritical conditions, such as at a temperature from about 150° C. to about 350° C. and at a pressure that is high enough to prevent substantial vaporization of water in the reactor; i.e., to maintain the reaction mixture substantially as liquid. Higher operating pressures, as used in supercritical reaction systems, are viewed as unnecessary and uneconomical.

It was discovered that a ruthenium metal deposited as an additional dispersed phase upon the porous support is effective in resisting agglomeration or sintering of the nickel metal catalyst phase, thereby increasing the useful life time of the catalyst during hydrogenation reactions. As depicted in FIG. 1, a particle 100 of a porous support has pores 102. The dispersed catalyst phase is a plurality of solid droplets 104 of a reduced nickel metal. The ruthenium metal is a second plurality of solid droplets 106 of an agglomeration retarding metal. Both the dispersed catalyst solid droplets 104 and the agglomeration retarding metal solid droplets 106 adhere to surfaces of the particle 100 or surfaces of the pores 102.

According to the present invention the nickel in the dispersed phase 104 may have impurities or be doped or alloyed with a material that may either be effective or ineffective in increasing catalytic activity. Further it is contemplated that the ruthenium metal 106 may be an alloy or dispersed combination of metals. For example, the dispersed reduced nickel phase may be a reduced nickel/copper catalytic alloy having substantially more reduced nickel than copper and the additional metal dispersed phase for agglomeration resistance may be a second alloy of nickel or reduced nickel and ruthenium having substantially more ruthenium than nickel. Alternatively, the added metal may simply be a non-alloyed ruthenium. Other metals that may be used for alloying with either the reduced nickel metal or the ruthenium include but are not limited to copper, silver, rhenium and tin.

The amount of reduced nickel in the catalytic dispersed phase is preferably at least about 20 wt %, and more preferably about 50 wt %.

In a preferred embodiment, the ruthenium metal is a separate and distinct phase from the dispersed nickel phase and prevents or retards agglomeration of the nickel phase between catalyst particles. It is further preferred that the amount of ruthenium metal is preferably less than or equal to about 5 wt %, more preferably less than 2 wt %, and most preferably from about 0.1 wt % to about 1 wt %.

The porous support may be any porous support including but not limited to alumina, e.g. as alumina powder in the form of alpha alumina, titania in the rutile form, zirconia in the monoclinic form, high-surface area granulated carbons, böhmite or a commercial support from a G1-80 catalyst. A preferred support is one that is stable in aqueous phase chemical reaction conditions. Stable means physically intact and chemically inert and does not come apart or disintegrate under aqueous phase reaction conditions.

The method for making the catalyst of the present invention has the steps of forming a porous support with an amount of a reduced nickel metal catalyst dispersed phase deposited upon the porous support providing a catalyst activity, followed by depositing an additional metal upon the porous support as an additional dispersed phase in an amount that is effective in resisting agglomeration or sintering of the reduced nickel metal catalyst phase.

It is preferred that the deposition of the additional metal is separate and distinct from forming the porous support with an amount of reduced nickel metal catalyst dispersed phase. Specifically, the reduced nickel metal catalyst phase may be applied to a support or the reduced nickel metal catalyst phase and support may be co-precipitated. However, the additional metal deposition occurs separately from the formation of the supported reduced nickel metal catalyst phase and may be accomplished by impregnation of the porous support with soluble salts of the additional metal followed by reduction of the salt to the metal form. Salt solution is wetted onto the surface of the catalyst and goes into the pores of the catalyst, then dried.

EXAMPLE 1

An experiment was conducted to identify that added ruthenium metal would be effective in preventing agglomeration or sintering of the reduced nickel catalyst. All catalysts used in this experiment containing 50 wt % reduced nickel dispersed on the support (G1-80 BASF, Geismar, La.). The added ruthenium metal was in an amount of 1 wt % or 5 wt % dispersed on the support.

In order to study a catalyzed organic conversion process of the present invention, an experimental reactor system was developed. In the experimental system, aqueous organic feed was converted at low temperatures (350° C.) and pressures up to 340 atm to gases consisting primarily of methane, carbon dioxide and hydrogen. The experimental system was equipped with a sampling system which allowed several samples to be taken throughout the course of the experiment while the reactor was maintained at reaction temperature and pressure. Details of the experimental reaction systems used for this process are set forth in co-pending application Ser. No. 08/227,892 hereby incorporated by reference.

The catalyst was added to a mixture of phenol and water with the amount of phenol of about 10 vol %, 240,000 ppm COD. The amount of catalyst compared to mixture was about 1:6. The catalyzed mixture was placed in a reactor vessel and heated to 350° C. to achieve gasification of the phenol. This gasification includes steam reforming reactions and hydrogenation reactions within the reaction vessel. Product gas samples were withdrawn through a sample port every 15–25 minutes over 2 hours. After the test was completed, used catalyst was recovered from the reactor and examined with X-Ray Diffraction analysis.

The used catalysts were further placed in water without any phenol and with a hydrogen cover gas in a reaction vessel simulating hydrogenation conditions. The reaction vessel was heated to and held at 350° C. for 60 to 65 hours to age the catalyst. Additional X-Ray Diffraction analysis was performed on the aged catalyst.

Results of crystallite size measurements for the aged catalysts are shown in Table 1. Surprising reduction in agglomeration up to a factor of 4 in terms of crystallite size was accomplished with the added ruthenium metal.

TABLE 1

Catalyst Crystallite Size

| Added Metal | Initial Crystallite Size (nm) | Aged Crystallite Size (nm) |
|---|---|---|
| None | 6 | 40 |
| Ruthenium (5%) | 4.5 | 19 |

Results for the gasification are shown in Table 2. Nickel catalyst is very active for Low-Temperature Catalytic Gasification. Addition of ruthenium, even at 0.1%, increased catalytic activity.

TABLE 2

Nickel Catalyst Batch Test Results

| Added Metal | Time (min) | Product Gas Composition (vol %) | | | | | Residual COD, ppm | Gasification of carbon, % |
|---|---|---|---|---|---|---|---|---|
| | | $CH_4$ | $CO_2$ | $H_2$ | $C_2$ | BF | | |
| None | 120 | 55.2 | 40.3 | 3.3 | 0.5 | 0.6 | 1320 | 87.6 |
| 0.1% Ru | 125 | 53.7 | 43.5 | 1.7 | 0.5 | 0.6 | 1600 | 96.2 |
| 5% Ru | 115 | 59.7 | 36.5 | 3.0 | 0.5 | 0.4 | 1140 | 89.8 |

BF = backflush from chromatography columns, assumed to be higher hydrocarbons.
In all cases the reaction appeared to be complete before the end time of the test.

Long term tests of reactions of phenol in water up to 24 weeks were performed with the catalytic mixtures. Temperatures were maintained at about 350° C.

Figure 2:
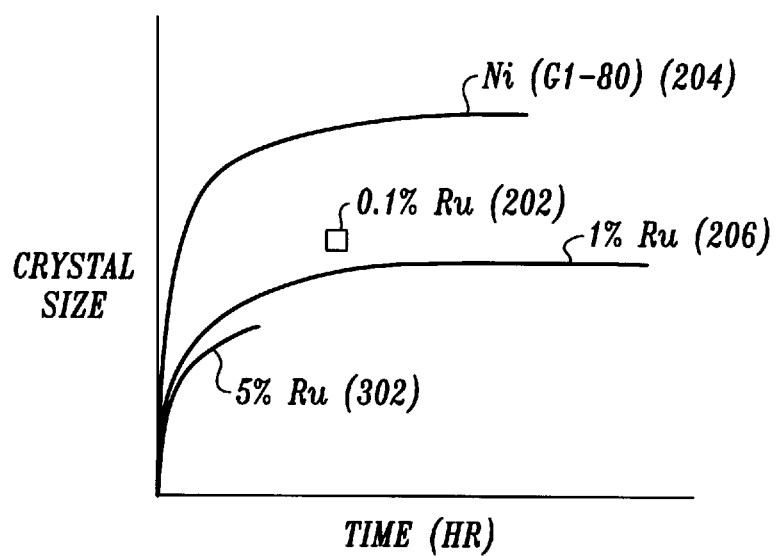
FIG. 2 is a graph of crystal size versus time for reduced nickel plus ruthenium dispersed phase in varying amounts.

Long term test results are shown in FIG. 2, the nickel-only catalyst retained activity for up to four weeks of operation. The nickel metal exhibited the same crystallite growth seen in nickel-only dispersed metal catalysts as reported in Elliott et al. (See Background) except that after an initial period of growth (up to 40 hours) the crystallites stabilized at 40 nm, up from <5 nm. This compared with growth to >70 nm or 100 nm in the same time period or less with the nickel-only dispersed metal catalysts.

The relationship of crystallite size with time on stream in catalytic gasification is shown in FIG. 2 for the added ruthenium metal combinations tested herein. FIG. 2 shows crystallite size for nickel-only catalyst 200 and for ruthenium metal catalysts (202, 204, 206). The added ruthenium metal catalysts (202, 204, 206) exhibit greater stability (less increase or growth of crystal size) compared to the nickel-only catalyst 200. The effect of stabilization may be achieved with varying amounts of the added metal dispersed phase. More specifically, the stability of the ruthenium dispersed phase at 1 wt % 204 is about the same or slightly better than the stability of the ruthenium dispersed phase at 0.1 wt % 202, and only slightly less than the stability of the ruthenium dispersed phase at 5 wt % 206.

The use of less than 1 wt % ruthenium in the reduced nickel may sufficiently stabilize the reduced nickel metal such that crystal growth and resultant loss of active surface area are no longer problems, as they have been with nickel use alone. In this case Ru would act as a spacer to limit crystal growth.

Long term test results are shown in Table 3, the nickel-only catalyst retained activity for up to four weeks of operation. The nickel metal exhibited the same crystallite growth seen in other nickel-only dispersed metal catalysts as reported in Elliott et al. (See Background) except that after an initial period of growth (up to 40 hours) the crystallites stabilized at 40 nm, up from <5 nm. This compared with growth to >70 nm or 100 nm in the same time period or less with the nickel-only dispersed metal catalysts.

TABLE 3

Long Term Results for Nickel-only and Stabilized Nickel Catalysts

| catalyst | 3 weeks | | 4 weeks | | 6 weeks | | 9 weeks | | 24 weeks | |
|---|---|---|---|---|---|---|---|---|---|---|
| | conv$^A$ | LHSV$^B$ | con | LHSV | con | LHSV | con | LHSV | con | LHSV |
| Ni-only | 95.1 | 1.55 | 93.6 | 1.41 | — | — | — | — | — | — |
| 0.1% Ru | — | — | 93.1 | 2.3 | 94.4 | 2.05 | 93.7 | 1.75 | — | — |
| 1% Ru | 99.99 | 1.9 | — | — | 99.8 | 1.9 | 99.8 | 1.8 | 99.0 | 1.7 |
| 5% Ru | 99.9 | 1.97 | 99.8 | 2.2 | — | — | — | — | — | — |

$^A$conv = reduction of chemical oxygen demand
$^B$LHSV = Liquid Hourly Space Velocity (vol. of solution)/(volume of catalyst bed)/hour Ruthenium was added to the nickel catalyst at 0.01 wt %, 1 wt % and 5 wt %. The 5 wt % loading produced a very active and longer lived catalyst. After four weeks of operation the catalyst was still very active while maintaining a respectable space velocity, as shown in Table 4. Analysis of the catalyst showed that the nickel crystallites had grown only to 26 nm, thus confirming the hypothesis of the test.

The 1 wt % loading would make the catalyst less expensive. In addition, it was also found to be very active in low-temperature catalytic gasification. As shown in Table 4, a long term test verified high activity for at least 6 months. The nickel crystallite size after 8 months was still <30.0 nm.

The 0.1% ruthenium loading was found to be significantly less active than the other Ru-doped nickel catalyst while still somewhat more active than the undoped catalyst. It exhibited significant loss of activity during the second month of operation, as shown in Table 4. The nickel crystallite size after 63 days (2 months) was 31.0 nm.

The ruthenium appeared to have a significant effect in preventing agglomeration of the nickel phase.

Useful catalyst support materials were also been identified by testing in the batch reactor. Most conventional supports consisting of silicates or refractory cements have been found to be chemically and physically unstable in the reaction environment of the present process. Tests with various aluminas showed that böhmite is the thermodynamically favored form at those conditions, as the δ, , and γ forms all react to form böhmite. Only the α-alumina appears to resist hydration at reaction conditions. Other potential supports have been tested including carbon granules and titania and zirconia tableted powders. All exhibit relatively good chemical-stability at reaction conditions. The metal-loaded carbon did show some reaction of the carbon with the water to produce gases, which may limit its utility in the long term. Neither titania nor zirconia were hydrated and the zirconia in particular maintained a strong physical integrity.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for hydrogenation of an organic material in an aqueous phase into a product, comprising the steps of:
   providing a liquid reactant mixture containing liquid water and said organic material within a pressure reactor;
   adding a catalyst in the form of a plurality of particles, each particle formed of a porous support with an amount of a reduced nickel metal catalyst phase deposited upon the porous support in a first dispersed phase providing a catalyst activity, further having an added ruthenium metal upon the porous support as a second dispersed phase in an amount that is effective in resisting agglomeration or sintering of the nickel metal catalyst phase, wherein said second dispersed phase is separate and distinct from said first dispersed phase, and
   maintaining said liquid reactant mixture at temperature and pressure conditions from about 150° C. to about 350° C. and a hydrogen overpressure.

2. The method as recited in claim 1, wherein hydrogenation is selected from the group consisting of saturation of multiple bonds, reduction of oxygen functional groups, hydrogenolysis, scission of ether linkages, similar reactions of organically bound nitrogen, hydrocracking of hydrocarbon structures, methane synthesis, and combinations thereof.

3. The method as recited in claim 1, wherein the amount of the added ruthenium metal is less than or equal to about 5 wt %.

4. The method as recited in claim 3, wherein the amount of the added ruthenium metal is less than 2 wt %.

5. The method as recited in claim 4, wherein the amount of the added ruthenium metal is from about 0.1 wt % to about 1 wt %.

6. The method as recited in claim 5, wherein the amount of reduced nickel metal catalyst phase is at least about 20 wt %.

7. The method as recited in claim 5, wherein the amount of reduced nickel metal catalyst phase is about 50 wt %.

8. The method as recited in claim 1, wherein the amount of nickel metal catalyst phase is co-precipitated with the support.

9. The method as recited in claim 1, wherein said reduced nickel metal catalyst phase is an alloy containing said reduced nickel metal in an amount greater than an alloy metal.

10. The method as recited in claim 9, wherein said alloy metal is selected from the group consisting of copper, silver, tin, rhenium, ruthenium and combinations thereof.

11. The method as recited in claim 1, wherein said added ruthenium metal is an alloy containing said added ruthenium metal in an amount greater than an alloy metal.

12. The method as recited in claim 11, wherein said alloy metal is selected from the group consisting of copper, silver, tin, rhenium, nickel and combinations thereof.

13. The method as recited in claim 1, wherein said porous support is stable during the maintaining step, remaining physically intact and chemically inert without coming apart or disintegrating during the maintaining step.

14. The method as recited in claim 13, wherein said porous support is selected from the group consisting of titania in a rutile form, zirconia in a monoclinic form, high-surface area granulated carbons, boehmite, and a commercial support from a G1-80 catalyst.

15. A catalyst for reacting an organic material in an aqueous phase, comprising:

a particle formed of a porous support with an amount of a reduced nickel metal catalyst phase deposited upon the porous support in a first dispersed phase providing a catalyst activity, further having an added ruthenium metal upon the porous support as a second dispersed phase in an amount that is effective in resisting agglomeration or sintering of the nickel metal catalyst phase, wherein said second dispersed phase is separate and distinct from said first dispersed phase.

16. The catalyst as recited in claim 15, wherein the amount of the added ruthenium metal is less than or equal to about 5 wt %.

17. The catalyst as recited in claim 16, wherein the amount of the added ruthenium metal is less than 2 wt %.

18. The catalyst as recited in claim 17, wherein the amount of the added ruthenium metal is from about 0.1 wt % to about 1 wt %.

19. The catalyst as recited in claim 15, wherein the amount of reduced nickel metal catalyst phase is at least about 20 wt %.

20. The catalyst as recited in claim 15, wherein the amount of reduced nickel metal catalyst phase is about 50 wt %.

21. The catalyst as recited in claim 1, wherein the amount of nickel metal catalyst phase is co-precipitated with the support.

22. The catalyst as recited in claim 15, wherein said reduced nickel metal catalyst phase is an alloy containing said reduced nickel metal in an amount greater than an alloy metal.

23. The catalyst as recited in claim 22, wherein said alloy metal is selected from the group consisting of copper, silver, tin, rhenium, ruthenium and combinations thereof.

24. The catalyst as recited in claim 15, wherein said added ruthenium metal is an alloy containing said added ruthenium metal in an amount greater than an alloy metal.

25. The catalyst as recited in claim 24, wherein said alloy metal is selected from the group consisting of copper, silver, tin, rhenium, nickel and combinations thereof.

26. The catalyst as recited in claim 15, wherein said porous support is selected from the group consisting of titania in a rutile form, zirconia in a monoclinic form, high-surface area granulated carbons, boehmite, and a commercial support from a G1-80 catalyst.

* * * * *

UNITED STATES PATENT AND TRADEMARK OFFICE
CERTIFICATE OF CORRECTION

PATENT NO. : 5,814,112
DATED : 09/29/1998
INVENTOR(S) : Elliott et al.

It is certified that error appears in the above-identified patent and that said Letters Patent is hereby corrected as shown below:

On Fig.2, please replace "Ni (G1-80) (204)" with --Ni (G1-80) (200)--.

On Fig. 2, please replace "1% Ru (206)" with --1% Ru (204)--.

On Fig. 2, please replace "5% Ru (302)" with --5% Ru (206)--.

Signed and Sealed this

Fifteenth Day of May, 2001

Attest:

NICHOLAS P. GODICI

Attesting Officer

Acting Director of the United States Patent and Trademark Office